United States Patent
Nozaki et al.

(10) Patent No.: US 7,586,311 B2
(45) Date of Patent: *Sep. 8, 2009

(54) APPARATUS AND METHOD FOR MONITORING LOAD DRIVING CIRCUIT FOR ABNORMALITY

(75) Inventors: Takeshi Nozaki, Toyota (JP); Masahito Ozaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 388 days.

This patent is subject to a terminal disclaimer.

(21) Appl. No.: 10/592,107

(22) PCT Filed: Sep. 22, 2004

(86) PCT No.: PCT/JP2004/014319

§ 371 (c)(1),
(2), (4) Date: Sep. 8, 2006

(87) PCT Pub. No.: WO2006/033163

PCT Pub. Date: Mar. 30, 2006

(65) Prior Publication Data

US 2007/0223259 A1    Sep. 27, 2007

(51) Int. Cl.
*G01R 31/08* (2006.01)
*G01N 27/416* (2006.01)

(52) U.S. Cl. .................. 324/522; 324/429; 324/432; 324/433

(58) Field of Classification Search .......... 363/50; 324/500, 429, 432, 433, 522; 702/58
See application file for complete search history.

(56) References Cited

U.S. PATENT DOCUMENTS

| 5,669,353 | A | 9/1997 | Shirai et al. |
| 5,677,611 | A | 10/1997 | Yoshihara et al. |
| 6,548,984 | B2 * | 4/2003 | Shamoto et al. ............. 318/801 |
| 7,432,719 | B2 * | 10/2008 | Nozaki ....................... 324/522 |
| 7,443,139 | B2 * | 10/2008 | Mitsui et al. ................ 320/134 |

FOREIGN PATENT DOCUMENTS

| EP | 1 403 570 A2 | 3/2004 |
| JP | A-08-051800 | 2/1996 |
| JP | A-08-214592 | 8/1996 |
| JP | A-08-312435 | 11/1996 |
| JP | A-09-023501 | 1/1997 |

(Continued)

*Primary Examiner*—Jessica Han
*Assistant Examiner*—Emily Pham
(74) *Attorney, Agent, or Firm*—Oliff & Berridge, PLC

(57) ABSTRACT

An ECU executes a program including the steps of: when a DC/DC converter is boosting the voltage, calculating a VB estimate value, and if a state, where an absolute value of a difference between the VB estimate value and a VB value sensed by a VB sensor is at least a voltage threshold value X, has been continuing for a predetermined time, determining that the VB sensor is tentatively abnormal; if a state, where an absolute value of a difference between a VH voltage instruct value and a VH value sensed by a VH sensor is at least a voltage threshold value Z, has been continuing for a predetermined time, determining that the VH sensor is tentatively abnormal; and if the sensor is tentatively abnormal, stopping boosting, and specifying the abnormal sensor based on the deviation of the VB value and the VH value.

30 Claims, 5 Drawing Sheets

FOREIGN PATENT DOCUMENTS

| | | |
|---|---|---|
| JP | A-2000-162249 | 6/2000 |
| JP | A-2000-206221 | 7/2000 |
| JP | A-2001-159574 | 6/2001 |
| JP | A-2003-021004 | 1/2003 |
| JP | A-2003-068366 | 3/2003 |
| JP | A-2004-088866 | 3/2004 |
| JP | A-2004-116740 | 4/2004 |
| JP | A-2004-364404 | 12/2004 |

* cited by examiner

F I G. 1
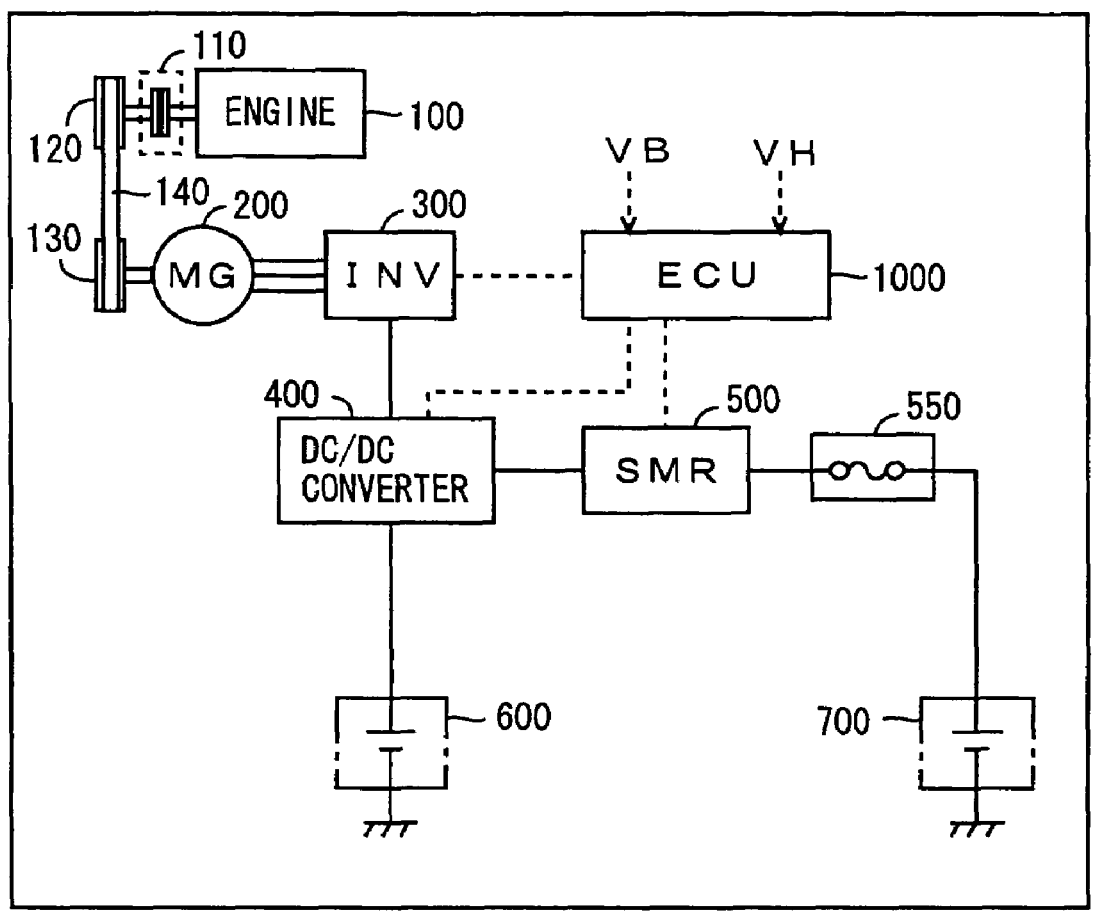

APPARATUS AND METHOD FOR MONITORING LOAD DRIVING CIRCUIT FOR ABNORMALITY

TECHNICAL FIELD

The present invention relates to an electric circuit driving a load incorporated in a vehicle, and particularly, to an apparatus and method for monitoring a sensor in the load driving circuit for abnormality.

BACKGROUND ART

In recent years, in order to deal with electrification and increased capacity of vehicle on-board equipment such as an electric power steering, an electric air conditioner and the like, a 42V-base vehicle power supply system wherein a 42V-base power supply is added to a conventional 14V-base power supply has been proposed. Since the 42V-base power supply can provide a three-fold voltage relative to the conventional 14V-base power supply, the required current is reduced to one-third, loss is decreased, and harness can be reduced in weight. Additionally, loads of large capacity can easily be dealt with. The capacity of a battery is increased relative to that of a conventional one, and in the future a nickel-hydride battery and/or lithium ion battery may replace the currently used lead acid battery.

However, application of 42V-base power supply to equipment such as a lamp may have an adverse effect of reducing the lifetime, for example, and therefore the conventional 14V-base power supply must also be reserved. Accordingly, recently a power supply system is proposed that includes both a main battery of 42V-base and a sub-battery of 14V-base, as well as a DC/DC converter to boost and step-down the voltage. It is noted that, a battery of 14V-base refers to a battery of which charging voltage is 14V and discharging voltage is 12V. Further, a battery of 42V-base refers to a battery of which charging voltage is 42V and discharging voltage is 36V.

Not being limited to such a power supply system, in a hybrid vehicle wherein the driving force of an engine is assisted by a motor, electric power from a battery of low voltage may be boosted by a DC/DC converter and provided to an inverter of the motor. Often in such a case, in order to reduce the current supplied to the motor for driving the vehicle so that the weight of the harness can be reduced, and also in order to attain high driving force for driving the vehicle, the rated voltage of the vehicle-driving motor is high. On the other hand, in order to increase the voltage of an on-board battery, a multiple of battery cells of about 1.2V must be serially connected. If the multiple of cells being serially connected cannot provide the rated voltage of the motor, the voltage of the battery is boosted by a DC/DC converter to be supplied to the motor via an inverter.

Thus, in an on-board electric circuit, it is necessary to boost and step-down the voltage of a battery, and a DC/DC converter is employed in such a case. Japanese Patent Laying-Open No. 8-214592 (Reference 1) discloses a motor driving apparatus that can realize driving of a motor, regenerative braking and charging of a battery with a simple configuration, and that also can refresh the battery. The motor driving apparatus includes: a driving circuit having at least one arm formed by two serially connected switching elements having flywheel diodes, having its input terminal connected to a battery and having its output terminal connected to a motor for exerting control of conduction over the motor by turning on/off the switching elements; a chopper circuit connected in parallel to the driving circuit and formed by serially connected two switching elements having flywheel diodes; a direct current side reactor connected between a neutral point of the chopper circuit and the battery; and a control circuit provided to exert control so as to turn on/off the switching elements of the driver circuit and chopper circuit, and to cause the chopper circuit to operate as a booster chopper when supplying electric power from the battery to the driving circuit and as a step-down chopper when supplying electric power from the driving circuit to the battery. Specifically, the control circuit exerts control so that the chopper circuit supplies the reference voltage of the battery to the driving circuit when the motor output is low, and that the chopper circuit operates as a booster chopper when the motor output is high.

According to the motor driving apparatus disclosed in Reference 1, when supplying the electric power from the battery via the driving circuit to the motor, the chopper circuit is operable as a booster chopper. Therefore, a voltage higher than the battery voltage can be applied to the motor, and the motor can be driven at higher speed than in the stationary state. Further, when supplying the electric power from the driver circuit to the battery, the chopper circuit is operable as a step-down chopper. Therefore, even when a motor generated voltage or an externally supplied voltage is higher than the battery voltage when the motor functions in regenerative braking mode or the battery is externally charged, the battery can be charged without a damage to circuit elements.

Japanese Patent Laying-Open No. 8-51800 (Reference 2) discloses a control method based on battery voltage estimation wherein control can be continued even when a voltage sensor is involved with abnormality. The control method includes the steps of: determining a motor primary voltage based on a battery voltage and a previous switching pattern; estimating each current value of the motor primary magnetic flux and the motor torque based on the motor primary voltage and a motor primary current; determining each instruct value of the motor primary magnetic flux and the motor torque based on a request output; determining a switching pattern by comparing each estimated current value of motor primary magnetic flux and motor torque with each determined instruct value of motor primary magnetic flux and motor torque; and alternating the motor primary current in accordance with the determined switching pattern to control an induction motor, wherein the battery voltage is detected by a voltage sensor in a normal state, and the battery voltage is estimated based on a load state of the battery when the output of the voltage sensor is abnormal.

According to the control method, when the output value of the voltage sensor is abnormal because of a failure in the voltage sensor detecting the battery voltage or because of a noise superimposed on the output of the sensor, an estimated value of the battery voltage is used. Accordingly, even when the output of the voltage sensor is abnormal, the control based on the fast direct torque control theory. Additionally, even when an error is included in the estimated value of the battery voltage, an unstable control state is not invited so long as the error is not extremely great. Since the battery voltage is estimated based on the load state of the battery, a great error does not occur in the estimated value and a stable control is realized over a wide range.

However, according to the motor driving apparatus disclosed in Reference 1, wherein the chopper circuit is provided in parallel to the inverter circuit so that the chopper circuit operates as a booster chipper when the output of the motor is high and as a step-down chopper when the motor operates in regenerative braking mode, the battery and others may be damaged if abnormality occurs in the voltage sensor during such adjustment of the voltage, since precise voltage control is not exerted. When the voltage is boosted, simple comparison between the voltage value sensed by the voltage sensor on the output side of the DC/DC converter (after boost) and that sensed by the voltage sensor of the battery does not clarify which voltage sensor is abnormal.

Further, according to the control method disclosed in Reference 2, it does not employ a configuration having a DC/DC converter, and instead, the voltage sensor is determined to be abnormal simply based on the relationship between the battery output and the battery voltage, and an induction motor is controlled using an estimated battery voltage in such a case. The abnormality of the battery voltage sensor is sensed only when there is a deviation from a map indicative of the battery output and the battery voltage.

In either case, for example when a voltage sensor on the input side of a DC/DC converter (before boost) is omitted for saving the costs and only a voltage sensor on the output side of the DC/DC converter (after boost) and a voltage sensor of the battery are provided, simple comparison of the voltage values sensed by respective sensors cannot provide precise sensing of abnormality even if either sensor is abnormal.

DISCLOSURE OF THE INVENTION

An object of the present invention is to provide, in a load driving circuit having a converter and a battery for supplying electric power to a load, an abnormality monitoring apparatus for the load driving circuit monitoring sensors sensing the voltage of each element for abnormality, and an abnormality monitoring method therefor.

An abnormality monitoring apparatus according to one aspect of the present invention is an abnormality monitoring apparatus for a load driving circuit that includes a converter performing at least one of a voltage boosting operation and a voltage stepping-down operation and a battery connected to an input side of the converter, the load driving circuit supplying electric power from the converter to a load. The abnormality monitoring apparatus includes: a battery voltage sensor sensing a voltage value of the battery; and an output side voltage sensor sensing a voltage value on an output side of the converter; and an electronic control unit executing a battery voltage estimation calculating process of calculating an estimated voltage value of the battery and, when the converter is performing the voltage boosting operation or the voltage stepping-down operation, a process of sensing tentative abnormality of the battery voltage sensor based on an absolute value of a difference between a voltage value of the battery sensed by the battery voltage sensor and the estimated voltage value, and sensing tentative abnormality of the output side voltage sensor based on an absolute value of a difference between a voltage value on the output side of the converter sensed by the output side voltage sensor and a voltage instruct value to the converter.

According to the abnormality monitoring apparatus, while converter is performing the voltage boosting operation or the voltage stepping-down operation, at least normal determination is not made as to the two voltage sensors. If a possibility of abnormality is sensed, a tentative abnormality is sensed.

Preferably, the electronic control unit further executes a process of sensing that the battery voltage sensor is tentatively abnormal if the absolute value of the difference between the voltage value of the battery sensed by the battery voltage sensor and the estimated voltage value is at least a predetermined threshold value, and a process of sensing that the output side voltage sensor is tentatively abnormal if the absolute value of the difference between the voltage value on the output side of the converter sensed by the output side voltage sensor and the voltage instruct value to the converter is at least a predetermined threshold value.

According to the abnormality monitoring apparatus, the battery voltage sensor can sense tentative abnormality based on the difference between the sensed voltage value and the estimated voltage value, and the output side voltage sensor can sense tentative abnormality based on the difference between the sensed voltage value and the voltage instruct value while the converter is operating.

Further preferably, the electronic control unit further executes a process of sensing that the battery voltage sensor is tentatively abnormal if a time, during which the absolute value of the difference between the voltage value of the battery sensed by the battery voltage sensor and the estimated voltage value is at least the predetermined threshold value, is at least a predetermined time, and a process of sensing that the output side voltage sensor is tentatively abnormal if a time, during which the absolute value of the difference between the voltage value on the output side of the converter sensed by the output side voltage sensor and the voltage instruct value to the converter is at least a predetermined threshold value, is at least a predetermined time.

According to the abnormality monitoring apparatus, the battery voltage sensor can precisely sense tentative abnormality based on the time during which the absolute value of the difference between the sensed voltage value and the estimated voltage value is great, and the output side voltage sensor can sense tentative abnormality based on the time during which the absolute value of the difference between the sensed voltage value and the voltage instruct value is great, even when the converter is operating.

Further preferably, the electronic control unit further executes a process of specifying, if tentative abnormality of the sensors is not sensed while the converter is performing the voltage boosting operation or the stepping-down operation and when the converter is performing neither the voltage boosting operation nor the voltage stepping-down operation, an abnormal sensor out of the sensors based on an absolute value of a difference between the voltage value of the battery sensed by the battery voltage sensor and the voltage value on an output side of the converter sensed by the output side voltage sensor, and on a tolerance of each sensor.

According to the abnormality monitoring apparatus, when the converter performs neither the voltage boosting operation nor the voltage stepping-down operation, the voltage value sensed by the battery voltage sensor and the voltage value sensed by the output side voltage sensor must show substantially the same value, if the sensors are not abnormal. If they do not indicate the same value, at least one of the sensors is abnormal. Based on the determination whether each sensor is outside the tolerance range, the abnormal sensor can be specified out of the two sensors.

Further preferably, the electronic control unit further executes a process of determining that either of the sensors is abnormal, if the absolute value of the difference between the voltage value of the battery sensed by the battery voltage sensor and the voltage value on the output side of the converter sensed by the output side voltage sensor is at least a predetermined threshold value. The electronic control unit executes a process of specifying that the battery voltage sensor is the abnormal sensor, if the voltage value sensed by the battery voltage sensor is outside a tolerance range of the battery voltage sensor. The electronic control unit executes a process of specifying that the output side voltage sensor is the abnormal sensor, if the voltage value sensed by the output side voltage sensor is outside a tolerance range of the output side voltage sensor.

According to the abnormality monitoring apparatus, it can be specified that the battery voltage sensor is the abnormal sensor. Additionally, it can be specified that the output side voltage sensor is the abnormal sensor.

Further preferably, the electronic control unit further executes, if: the absolute value of the difference between the voltage value of the battery sensed by the battery voltage sensor and the voltage value on the output side of the converter sensed by the output side voltage sensor is at least a predetermined threshold value; the voltage value sensed by the battery voltage sensor is not outside a tolerance range of the battery voltage sensor; and the voltage value on the output side of the converter sensed by the output side voltage sensor is not outside a tolerance range of the output side voltage sensor, a process of controlling the converter so that the converter starts the voltage boosting operation or the voltage stepping-down operation. The electronic control unit executes a process of specifying that the battery voltage sensor is abnormal if tentative abnormality of the battery voltage sensor is sensed. The electronic control unit executes a process of specifying that the output side voltage sensor is abnormal if tentative abnormality of the battery voltage sensor is not sensed.

According to the abnormality monitoring apparatus, when the converter performs neither the voltage boosting operation nor the voltage stepping-down operation, the voltage value sensed by the battery voltage sensor and the voltage value sensed by the output side voltage sensor must show substantially the same value, if the sensors are not abnormal. If they do not indicate the same value, the abnormal sensor can be specified based on whether tentative abnormality is sensed while the converter is caused to operate.

Further preferably, the electronic control unit further executes a process of specifying that the battery voltage sensor is abnormal if: tentative abnormality of the sensors is sensed while the converter is performing the voltage boosting operation or the voltage stepping-down operation; the voltage boosting operation or the voltage stepping-down operation by the converter is stopped; and an absolute value of a difference between the voltage value of the battery sensed by the battery voltage sensor and the voltage value on the output side of the converter sensed by the output side voltage sensor is at least a predetermined threshold value. The electronic control unit further executes a process of specifying that the battery voltage sensor and the output side voltage sensor are not tentatively abnormal if an absolute value of a difference between the voltage value of the battery sensed by the battery voltage sensor and the voltage value on the output side of the converter sensed by the output side voltage sensor is not at least a predetermined threshold value.

According to the abnormality monitoring apparatus, the abnormal sensor can be specified and determination of not being tentatively abnormal can be made, if tentative abnormality is sensed while the converter is performing the voltage boosting operation or the voltage stepping-down operation and the voltage boosting operation or the voltage stepping-down operation is stopped.

An abnormality monitoring method according to another aspect of the present invention is an abnormality monitoring method for a load driving circuit including: a converter performing at least one of a voltage boosting operation and a voltage stepping-down operation; a battery connected to an input side of the converter; a battery voltage sensor sensing a voltage value of the battery; and an output side voltage sensor sensing a voltage value on an output side of the converter, the load driving circuit supplying electric power from the converter to a load. The abnormality monitoring method includes: a battery voltage estimation calculating step of calculating an estimated voltage value of the battery; a step of sensing tentative abnormality of the battery voltage sensor based on an absolute value of a difference between a voltage value of the battery sensed by the battery voltage sensor and the estimated voltage value when the converter is performing the voltage boosting operation or the voltage stepping-down operation; and a step of sensing tentative abnormality of the output side voltage sensor based on an absolute value of a difference between a voltage value on the output side of the converter sensed by the output side voltage sensor and a voltage instruct value to the converter when the converter is performing the voltage boosting operation or the voltage stepping-down operation.

BRIEF DESCRIPTION OF THE DRAWINGS

FIG. 1 is a control block diagram of a vehicle including an abnormality monitoring apparatus according to an embodiment of the present invention.

BEST MODES FOR CARRYING OUT THE INVENTION

Figure 2:
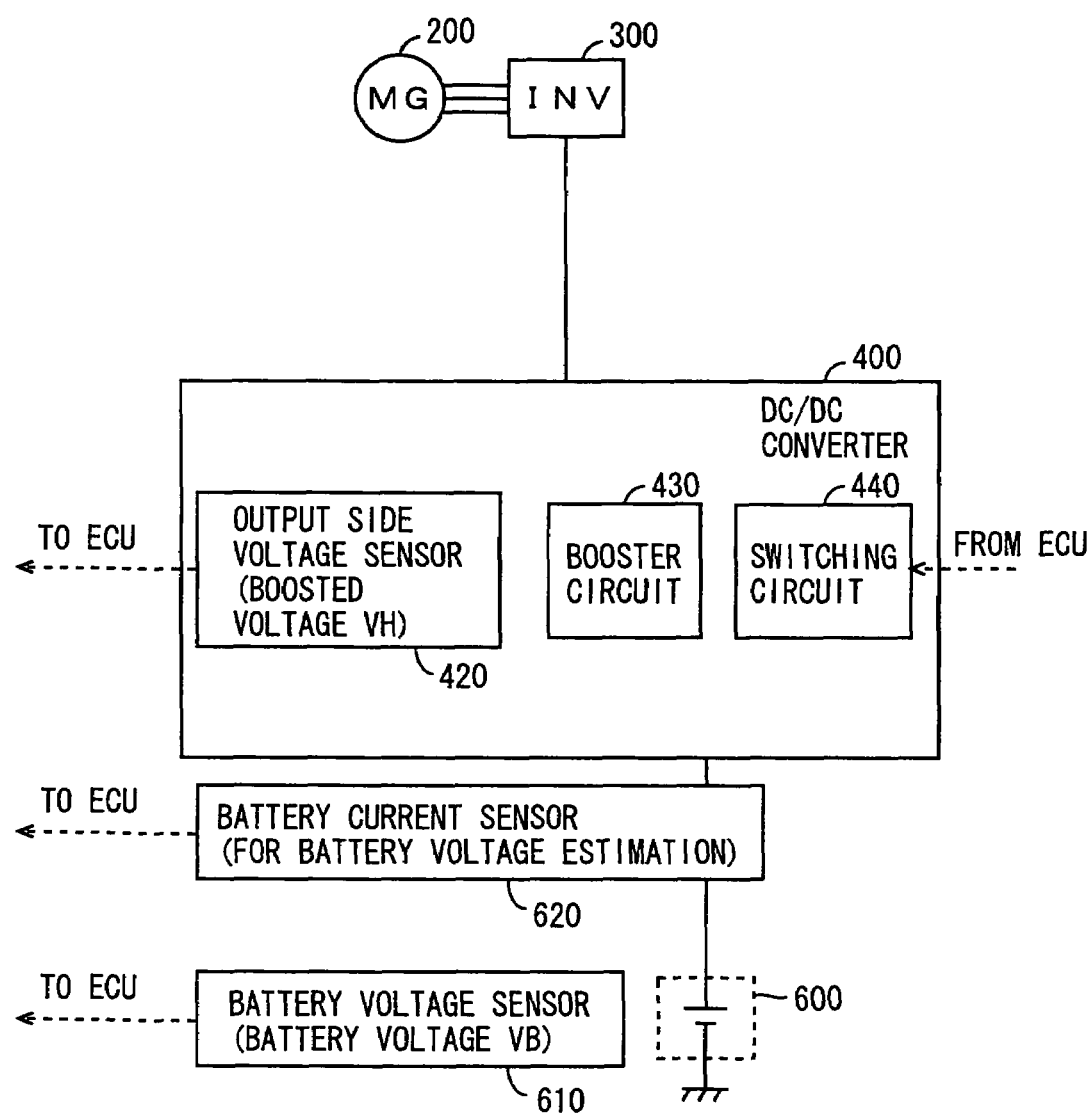
FIG. 2 is a partially enlarged view of FIG. 1.

In the following, referring to the drawings, an embodiment of the present invention is described. In the following description, the same parts are denoted by the same reference characters. Their name and function are also the same. Therefore, detailed description thereof is not repeated.

In the following embodiment, although a power supply system having two batteries incorporated in a vehicle is described, i.e., a 14V-base battery as a first battery and a 42V-base battery as a second battery, the present invention is not limitedly applied to such a power supply system incorporating two batteries of different voltage. Additionally, in the following embodiment, although what is called hybrid vehicle is described, which has an engine and a motor-generator operable as a motor to assist the engine and operable as a generator in regenerative braking for recovering the energy to charge the battery, the present invention is not limitedly applied to such a hybrid vehicle.

The present invention is applied to a system including a DC/DC converter, at least one battery connected to the input side of the DC/DC converter, and a load such as an inverter connected to the output side of the DC/DC converter. In such a system, a voltage sensor sensing the voltage value of the battery and a voltage sensor sensing the voltage value on the output side (load side) are monitored, in order to monitor whether an abnormality occurs in the voltage sensors.

In the following, a case is described wherein, in such a system, at least two voltage sensors are monitored when the voltage of the battery is boosted by the DC/DC converter and the battery supplies (via the inverter) electric power to the motor-generator functioning as a motor (that is, when the battery discharges). Here, the DC/DC converter may have both of a circuit for boosting the voltage and a circuit for stepping-down the voltage, or it may have only the booster circuit or the step-down circuit.

In the following, a vehicle including an electronic control unit (ECU) 1000 constituting an abnormality monitoring apparatus according to the embodiment of the present invention is described.

FIG. 1 is a control block diagram of a vehicle including ECU 1000 constituting the abnormality monitoring apparatus of the present embodiment. As shown in FIG. 1, the vehicle includes an engine 100, a motor-generator 200 functioning as a motor to assist engine 100, an inverter 300 supplying electric power to motor-generator 200, and a DC/DC converter 400 performing at least one of voltage boosting of a battery and voltage stepping-down of a battery to supply electric power of a prescribed voltage value to a load such as inverter 300. DC/DC converter 400 is connected to a first battery 600 (although first battery 600 is assumed to be a 14V-base battery herein, it is not limited thereto) and via a system main relay 500 and a fuse 500, to a second battery 700 (although second battery 700 is assumed to be a 42V-base battery herein, it is not limited thereto). DC/DC converter 400 can boost the electric power discharged from first battery 600 and/or second battery 700 to the rated voltage of inverter 300.

In the following description, first battery 600 is described as a battery for traveling, and for example as a nickel hydride battery of 200-300 [V], and DC/DC converter 400 is described as a converter boosting the voltage of first battery 600 to about 500 [V].

A crank shaft pulley 120 connected to engine 100 via an electromagnetic clutch 110 is connected to a motor-generator pulley 130 via a belt 140. Motor generator 200 assists engine 100 when it is supplied with electric power from inverter 300 to function as a motor. When the vehicle is in a regenerative braking state, motor generator 200 functions as a generator to achieve regenerative braking with the driving force from the driving wheel connected to the crank shaft of engine 100, and thereby converts the traveling energy to electric energy and charges the batteries.

ECU 1000 is connected to inverter 300, DC/DC converter 400 and system main relay 500, and transmits a control signal to each apparatus. In FIG. 1, control signal lines are indicated by dashed lines. Engine 100 is controlled by not-shown engine ECU.

The vehicle shown in FIG. 1 is a vehicle incorporating an idling stop system that automatically stops engine 100 when the vehicle stops, for example at the red light, and that controls electric power to auxiliary equipment using second battery 700. However, the present invention is not limited to such a vehicle incorporating the idling stop system. The vehicle may be what is generally called a hybrid vehicle having the engine and the motor as the driving source of the vehicle, and it may be a load driving circuit that does not have a motor-generator for assisting engine 100 and only includes battery 600, DC/DC converter 400, a load connected to DC/DC converter 400, and an ECU for controlling them.

FIG. 2 is a partially enlarged view of FIG. 1. As shown in FIG. 2, DC/DC converter 400 includes an output side voltage sensor 420 (hereinafter also referred to as VH sensor 420), a booster circuit 430, and a switching circuit 440. DC/DC converter 400 is characterized in that it does not have a voltage sensor on its input side. Switching circuit 440 controls booster circuit 430 of the DC/DC converter based on a control signal transmitted from ECU 1000, and converts the voltage of first battery 600 to a prescribed voltage and supplies it to inverter 300.

Output side voltage sensor 420 is connected to an output side circuit of DC/DC converter 400, senses the boosted voltage VH and transmits to ECU 1000. It is noted that output side voltage sensor 420 may be provided externally to DC/DC converter 400.

As shown in FIG. 2, a battery voltage sensor 610 (hereinafter also referred to as VB sensor 610) sensing battery voltage VB of first battery 600 and a battery current sensor 620 are provided to first battery 600. Battery voltage VB sensed by battery voltage sensor 610 and battery current IB sensed by battery current sensor 620 are transmitted to ECU 1000.

As shown in FIGS. 1 and 2, battery voltage VB and boosted voltage VH are input to ECU 1000. ECU 1000 monitors the voltage sensors for an abnormality, based on these input voltage values, a VB estimate value that is an estimated battery voltage and a voltage instruct value VH that is an instructed value to DC/DC converter 400, as to whether any voltage sensor is abnormal, individually for the case where DC/DC converter 400 is operating and for the case where it is not.

Figure 3:
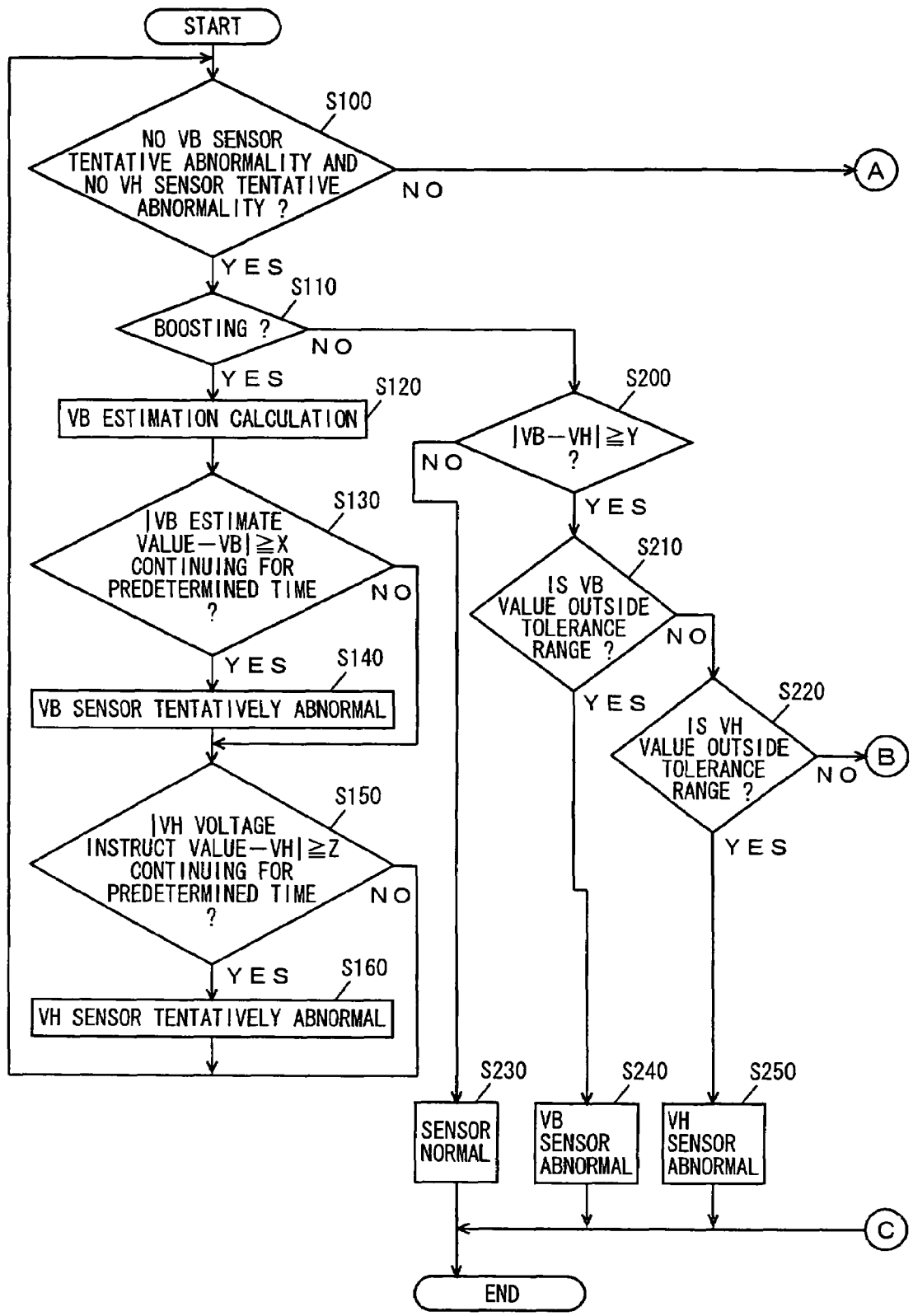
FIG. 3 is a flowchart (1) indicative of a control structure of a program executed by ECU in FIG. 1.
Figure 4:
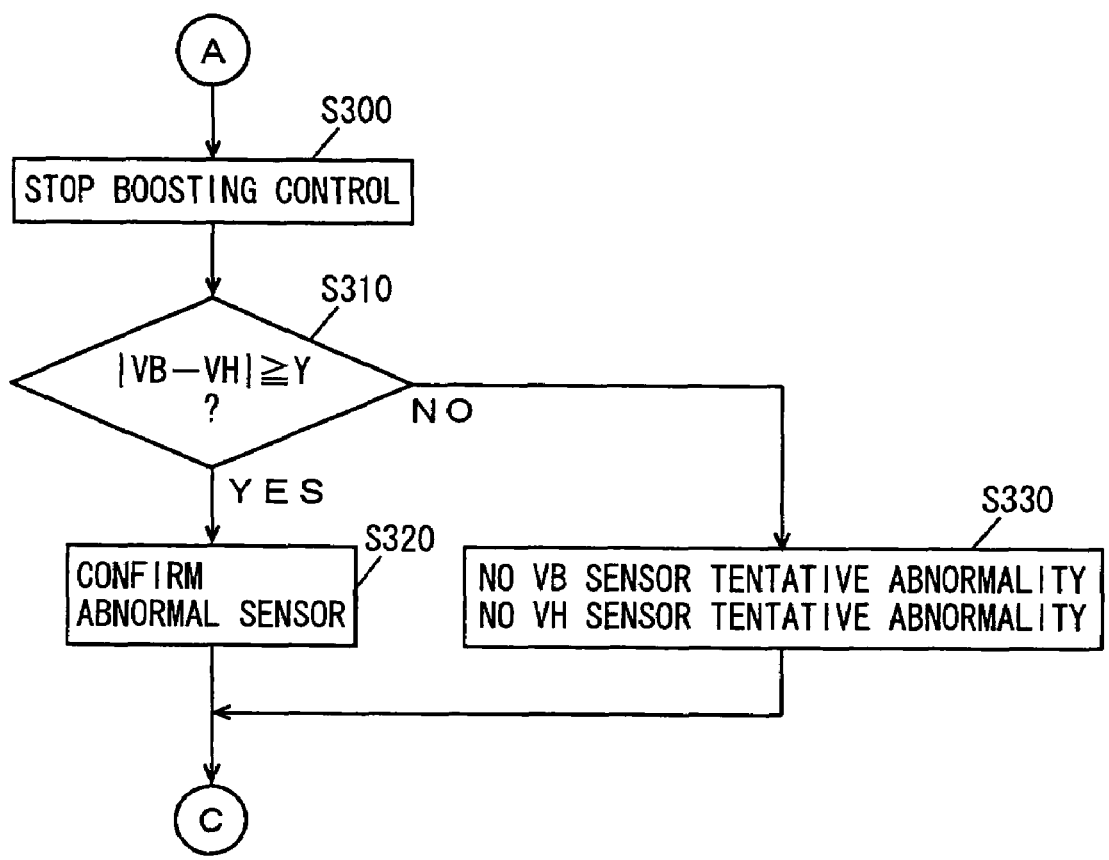
FIG. 4 is a flowchart (2) indicative of a control structure of a program executed by ECU in FIG. 1.
Figure 5:
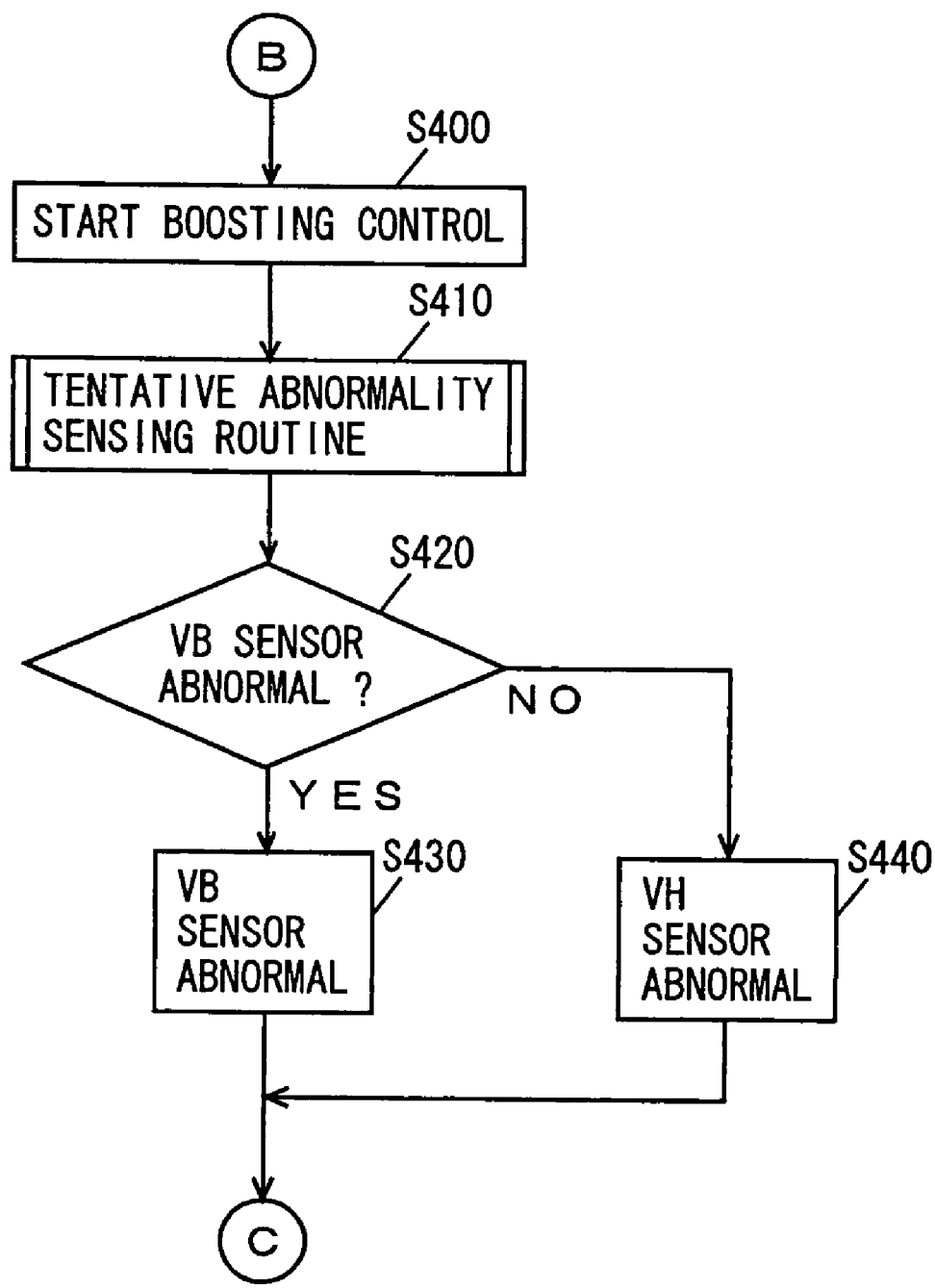
FIG. 5 is a flowchart (3) indicative of a control structure of a program executed by ECU in FIG. 1.

Referring to FIGS. 3-5, a control structure of a program executed by ECU 100 that is the abnormality monitoring apparatus according to the embodiment of the present invention is described.

In step (hereinafter step is abbreviated as S) 100, ECU 1000 determines whether VB sensor 610 is not involved with tentative abnormality and VH sensor 420 is not involved with tentative abnormality. This tentative abnormality will be described in detail later. If VB sensor 610 is not involved with tentative abnormality and VH sensor 420 is not involved with tentative abnormality (YES in S100), then the process goes to S110. Otherwise (NO in S100), the process goes to S300 in FIG. 4.

In S110, ECU 1000 determines whether DC/DC converter 400 is under boosting control. If DC/DC converter 400 is under the boosting control (YES in S110), then the process goes to S120. Otherwise (NO in S110), the process goes to S200.

In S120, ECU 1000 calculates VB estimate value that is an estimated voltage value of battery 600. To ECU 1000, a signal indicative of battery voltage VB transmitted from BV sensor 610, a signal indicative of boosted voltage VH transmitted from VH sensor 420, and a signal indicative of battery current IB transmitted from battery current sensor 620 are input. ECU 1000 calculates VB estimate value that is a currently estimated voltage value of the battery as "instructed electric power/battery current IB", for example. This instructed electric power is the electric power necessary for generating the driving torque required to drive the vehicle, and calculated by ECU 1000 based on the traveling state of the vehicle.

In S130, ECU 1000 determines whether a state of |VB estimate value−VB|≧voltage threshold value X has been continuing for a predetermined time. If the state of |VB estimate value−VB|≧voltage threshold value X has been continuing for a predetermined time (YES in S130), then the process goes to S140. Otherwise (NO in S130), the process goes to S150. In S140, ECU 1000 determines that VB sensor 610 is tentatively abnormal.

In S150, ECU 1000 determines whether a state of |VH voltage instruct value−VH|≧voltage threshold value Z has been continuing for a predetermined time. If the state of |VH voltage instruct value−VH|≧voltage threshold value Z has been continuing for a predetermined time (YES in S150), then the process goes to S160. Otherwise (NO in S150), the process goes to S100. In S160, ECU 1000 determines that VH sensor 420 is tentatively abnormal.

It is noted that, voltage threshold values X and Z are for example 50 [V], and the predetermined time is for example 1 [sec]. Such values are of an exemplary nature, and not of a limiting nature.

In S200, ECU 1000 determines whether a state of |VB−VH|≧voltage threshold value Y. If |VB−VH|≧voltage threshold value Y (YES in S200), then the process goes to S210. Otherwise (NO in S200), the process goes to S230. It is noted that, voltage threshold value Y is for example 70 [V]. Further, whether the time of |VB−VH|≧voltage threshold value Y has been continuing for a prescribed time may be determined, for example, setting the predetermined time to 500 [msec]. Such a value is of an exemplary nature and not of a limiting nature.

In S210, ECU 1000 determines whether VB value is outside a tolerance range of VB sensor 610. If VB value is outside the tolerance range of VB sensor 610 (YES in S210), then the process goes to S240. Otherwise (NO in S210), the process goes to S220.

In S220, ECU 1000 determines whether VH value is outside a tolerance range of VH sensor 420. If VH value is outside the tolerance range of VH sensor 420 (YES in S220), then the process goes to S250. Otherwise (NO in S220), the process goes to S400 in FIG. 5.

In S230, ECU 1000 determines that VB sensor 610 and VH sensor 420 are normal. In S240, ECU 1000 determines that VB sensor 610 is abnormal. In S250, ECU 1000 determines that VH sensor 420 is abnormal. After the steps of S230, S240 and S250, this process ends.

In S300 in FIG. 4, ECU 1000 stops the boosting control over DC/DC converter 400.

In S310, ECU 1000 determines whether |VB−VH|≧voltage threshold value Y. If |VB−VH|≧voltage threshold value Y (YES in S310), then the process goes to S320. Otherwise (NO in S310), the process goes to S330. It is noted that, voltage threshold value Y is for example 70 [V]. Further, whether the time of |VB−VH|≧voltage threshold value Y has been continuing for a prescribed time may be determined, for example, setting the predetermined time to 500 [msec]. Such a value is of an exemplary nature and not of a limiting nature.

In S320, ECU 1000 confirms that VB sensor 610 is abnormal if the VB sensor has been determined to be tentatively abnormal in the determination in S100, and confirms that VH sensor 420 is abnormal if the VH sensor has been determined to be tentatively abnormal in the determination in S100. In S300, ECU 1000 determines that VB sensor 610 is not tentatively abnormal and that VH sensor 420 is not tentatively abnormal. After the steps of S320 and S330, the process ends.

In S400 in FIG. 5, ECU 1000 starts the boosting control over DC/DC converter 400. In S410, ECU 1000 executes the tentative abnormality sensing routine. The tentative abnormality sensing routine refers to the process from S120 to S160.

In S420, ECU 1000 determines whether VB sensor 610 has been determined to be tentatively abnormal. If VB sensor 610 has been determined to be tentatively abnormal (YES in S420), the process goes to S430. Otherwise (NO in S420), the process goes to S440.

In S430, ECU 1000 determines that VB sensor 610 is abnormal. In S440, ECU 1000 determines that VH sensor 420 is abnormal. After the steps of S430 and S440, the process ends.

An operation of a vehicle incorporating ECU 1000 that is the abnormality monitoring apparatus according to the present embodiment based on the foregoing structure and flowcharts is described.

While the vehicle is traveling, the abnormality determination process is executed at a predetermined sampling time (for example the sampling time determined by the clock frequency of the CPU (Central Processing Unit) included in ECU 1000).

[When Not Under the Boosting Control]

An absolute value |VB−VH| of the difference between battery voltage value VB sensed by VB sensor 610 and boosted voltage value VH sensed by VH sensor 420 is calculated. If |VB−VH| is not at least voltage threshold value Y (NO in S200), both of the sensors are determined to be normal (S230).

If |VB−VH| is at least voltage threshold value Y (YES in S200) and VB sensor 610 shows a value outside a possible value range in view of design (outside the tolerance range) (YES in S210), then VB sensor 610 is determined to be abnormal (S240).

If |VB−VH| is at least voltage threshold value Y (YES in S200) but VB sensor 610 shows a value not outside the possible value range in view of design (outside the tolerance range) (NO in S210) and VH sensor 420 shows a value outside the possible value range in view of design (outside the tolerance range) (YES in S220), then VH sensor 420 is determined to be abnormal (S250).

If |VB−VH| is at least voltage threshold value Y (YES in S200) but VB sensor 610 shows a value not outside the possible value range in view of design (outside the tolerance range) (NO in S210) and VH sensor 420 shows a value not outside the possible value range in view of design (outside the tolerance range) (NO in S220), then it can be determined that the abnormality of these sensors is not critical. Accordingly, DC/DC converter 400 is caused to boost (S400), and the tentative abnormality sensing routine is executed (S410). If VB sensor 610 is determined to be tentatively abnormal (YES in S420), it is determined that VB sensor 610 is abnormal (S430). If VB sensor 610 is not determined to be tentatively abnormal (NO in S420), then VH sensor 420 is determined to be abnormal (S440).

[When Under the Boosting Control]

When DC/DC converter 400 operates to boost (YES in S110), a VB estimate value that is an estimated voltage value of battery 600 is calculated (S120). |VB estimate value−VB| is calculated, which is the absolute value of the difference between battery voltage value VB sensed by VB sensor 610 and the VB estimate value. If a time during which |VB estimate value−VB| is at least voltage threshold value X has been continuing for a predetermined time (YES in S130), then VB sensor 610 is determined to be tentatively abnormal (S140).

If the time during which |VB estimate value−VB| is at least voltage threshold value X has not been continuing for a predetermined time (NO in S130), then |VH voltage instruct value−VH| is calculated, which is the absolute value of the difference between a VH voltage instruct value that is a instruct value to DC/DC converter 400 and boosted voltage value VH sensed by VH sensor 420. If a time during which |VH voltage instruct value−VH| is at least voltage threshold value Z has been continuing for a predetermined time (YES in S150), then VH sensor 420 is determined to be tentatively abnormal (S160).

If the time during which |VB estimate value−VB| is at least voltage threshold value X has not been continuing for a predetermined time (NO in S130), and the time during which |VH voltage instruct value−VH| is at least voltage threshold value Z has not been continuing for a predetermined time (NO in S150), then neither sensor is determined to be tentatively abnormal.

If either of the sensors is determined to be tentatively abnormal when DC/DC converter 400 is under the boosting control (NO in S100), the boosting control over DC/DC converter 400 is stopped (S300).

In a state where DC/DC converter 400 is not under the boosting control, the absolute value |VB−VH| that is the absolute value of the difference between battery voltage value VB sensed by VB sensor 610 and boosted voltage value VH sensed by VH sensor 420 is calculated. If the value |VB−VH| is at least voltage threshold value Y (YES in S310) and VB sensor 610 has been determined to be tentatively abnormal, then VB sensor 610 is confirmed to be abnormal. If the value |VB−VH| is at least voltage threshold value Y (YES in S310) and VH sensor 420 has been determined to be tentatively abnormal, then VH sensor 420 is confirmed to be abnormal (S320). If the value |VB−VH| is not at least voltage threshold value Y (NO in S310), the VB sensor 610 and VH sensor 420 are confirmed to be abnormal (S330).

[Effect of Abnormality Sensing]

By the operation as described above, abnormality of VB sensor 610 and boosted voltage sensor 420 can precisely be sensed even when DC/DC converter is operating to boost. If abnormality of the sensors is not sensed in this manner, the following problem may arise.

If voltage VB of battery 600 cannot precisely be sensed, e.g., if battery voltage VB is sensed to be lower than the actual value, then rather lower SOC (States Of Charge) is estimated, which tends to invite overcharging. When battery 600 is overcharged, a problem arises that the temperature of battery 600 increases, leading to earlier deterioration of battery 600. On the other hand, by monitoring abnormality of VB sensor 610 that precisely senses the voltage of battery 600 as in the present embodiment, such a problem will not arise.

If boosted voltage VH in DC/DC converter 400 cannot precisely be sensed, e.g., if boosted voltage VH is sensed to be lower than the actual value, then the boosting control is not precisely performed. When the voltage is too high, an electric element in the driving circuit may be damaged, and when the voltage is too low, the required driving force cannot be obtained since the required voltage is not obtained. On the other hand, by monitoring abnormality of VH sensor 420 that precisely senses the voltage boosted by DC/DC converter 400 as in the present embodiment, such a problem will not arise.

As above, according to the abnormality monitoring apparatus of the present embodiment, when the DC/DC converter is under the boosting control, tentative abnormality of the VB sensor is sensed using battery voltage value VB that is the sensed battery voltage and the VB estimate value, whereas tentative abnormality of the VH sensor is sensed using boosted voltage VH that is the sensed boosted voltage and the VH voltage instruct value. When such tentative abnormality is sensed, the boosting control of the DC/DC converter is stopped, and abnormality of a sensor can be sensed based on the absolute value of the difference between battery voltage value VB and boosted voltage value VH. If the absolute value of the difference between battery voltage value VB and boosted voltage value VH is great when such a tentative abnormality is not sensed and the DC.DC converter is not under the boosting control, abnormality of a sensor can be sensed based on a tolerance of each sensor.

It should be understood that the embodiment disclosed herein is illustrative and non-restrictive in every respect. The scope of the present invention is defined by the terms of the claims, rather than the description and example above, and is intended to include any modifications and changes within the scope and meaning equivalent to the terms of the claims.

The invention claimed is:

1. An abnormality monitoring apparatus for a load driving circuit including a converter performing at least one of a voltage boosting operation and a voltage stepping-down operation and a battery connected to an input side of said converter, said load driving circuit supplying electric power from said converter to a load, said apparatus comprising:
    first sensing means for sensing a voltage value of said battery;
    second sensing means for sensing a voltage value on an output side of said converter;
    battery voltage estimation calculating means for calculating an estimated voltage value of said battery; and
    monitoring means for, when said converter is performing the voltage boosting operation or the voltage stepping-down operation, sensing tentative abnormality of said first sensing means based on an absolute value of a difference between a voltage value of said battery sensed by said first sensing means and said estimated voltage value, and sensing tentative abnormality of said second sensing means based on an absolute value of a difference between a voltage value on the output side of said converter sensed by said second sensing means and a voltage instruct value to said converter.

2. The abnormality monitoring apparatus according to claim 1, wherein
    said monitoring means includes means for sensing that said first sensing means is tentatively abnormal if the absolute value of the difference between the voltage value of said battery sensed by said first sensing means and said estimated voltage value is at least a predetermined threshold value, and for sensing that said second sensing means is tentatively abnormal if the absolute value of the difference between the voltage value on the output side of said converter sensed by said second sensing means and the voltage instruct value to said converter is at least a predetermined threshold value.

3. The abnormality monitoring apparatus according to claim 1, wherein
    said monitoring means includes means for sensing that said first sensing means is tentatively abnormal if a time, during which the absolute value of the difference between the voltage value of said battery sensed by said first sensing means and said estimated voltage value is at least the predetermined threshold value, is at least a predetermined time, and for sensing that said second sensing means is tentatively abnormal if a time, during which the absolute value of the difference between the voltage value on the output side of said converter sensed by said second sensing means and the voltage instruct value to said converter is at least a predetermined threshold value, is at least a predetermined time.

4. The abnormality monitoring apparatus according to claim 1, further comprising
    determining means for specifying, if tentative abnormality of said sensing means is not sensed by said monitoring means while said converter is performing the voltage boosting operation or the stepping-down operation, and when said converter is performing neither the voltage boosting operation nor the voltage stepping-down operation, abnormal sensing means out of said sensing means based on an absolute value of a difference between the voltage value of said battery sensed by said first sensing means and the voltage value on an output side of said converter sensed by said second sensing means, and on a tolerance of each sensing means.

5. The abnormality monitoring apparatus according to claim 4, wherein
said determining means includes means for specifying that said first sensing means is the abnormal means, if the absolute value of the difference between the voltage value of said battery sensed by said first sensing means and the voltage value on the output side of said converter sensed by said second sensing means is at least a predetermined threshold value and the voltage value sensed by said first sensing means is outside a tolerance range of said first sensing means.

6. The abnormality monitoring apparatus according to claim 4, wherein
said determining means includes means for specifying that said second sensing means is the abnormal means, if the absolute value of the difference between the voltage value of said battery sensed by said first sensing means and the voltage value on the output side of said converter sensed by said second sensing means is at least a predetermined threshold value and the voltage value on the output side of said converter sensed by said second sensing means is outside a tolerance range of said second sensing means.

7. The abnormality monitoring apparatus according to claim 4, wherein
said determining means includes means for
controlling said converter so that said converter starts the voltage boosting operation or the voltage stepping-down operation, if: the absolute value of the difference between the voltage value of said battery sensed by said first sensing means and the voltage value on the output side of said converter sensed by said second sensing means is at least a predetermined threshold value; the voltage value sensed by said first sensing means is not outside a tolerance range of said first sensing means; and the voltage value on the output side of said converter sensed by said second sensing means is not outside a tolerance range of said second sensing means, and for
specifying that said first sensing means is abnormal if tentative abnormality of said first sensing means is sensed by said monitoring means.

8. The abnormality monitoring apparatus according to claim 4, wherein
said determining means includes means for
controlling said converter so that said converter starts the voltage boosting operation or the voltage stepping-down operation if: the absolute value of the difference between the voltage value of said battery sensed by said first sensing means and the voltage value on the output side of said converter sensed by said second sensing means is at least a predetermined threshold value; the voltage value sensed by said first sensing means is not outside a tolerance range of said first sensing means; and the voltage value on the output side of said converter sensed by said second sensing means is not outside a tolerance range of said second sensing means, and for
specifying that said second sensing means is abnormal if tentative abnormality of said first sensing means is not sensed by said monitoring means.

9. The abnormality monitoring apparatus according to claim 1, further comprising
means for specifying that said first sensing means is abnormal if: tentative abnormality of said means is sensed by said monitoring means while said converter is performing the voltage boosting operation or the voltage stepping-down operation; the voltage boosting operation or the voltage stepping-down operation by said converter is stopped; and an absolute value of a difference between the voltage value of said battery sensed by said first sensing means and the voltage value on the output side of said converter sensed by said second sensing means is at least a predetermined threshold value.

10. The abnormality monitoring apparatus according to claim 1, further comprising
means for determining that said first sensing means and said second sensing means are not tentatively abnormal if: tentative abnormality of said means is sensed by said monitoring means while said converter is performing the voltage boosting operation or the voltage stepping-down operation; the voltage boosting operation or the voltage stepping-down operation by said converter is stopped; and an absolute value of a difference between the voltage value of said battery sensed by said first sensing means and the voltage value on the output side of said converter sensed by said second sensing means is not at least a predetermined threshold value.

11. An abnormality monitoring apparatus for a load driving circuit including a converter performing at least one of a voltage boosting operation and a voltage stepping-down operation and a battery connected to an input side of said converter, said load driving circuit supplying electric power from said converter to a load, said apparatus comprising:
a battery voltage sensor sensing a voltage value of said battery;
an output side voltage sensor sensing a voltage value on an output side of said converter; and
an electronic control unit executing
a battery voltage estimation calculating process of calculating an estimated voltage value of said battery and,
when said converter is performing the voltage boosting operation or the voltage stepping-down operation, a process of sensing tentative abnormality of said battery voltage sensor based on an absolute value of a difference between a voltage value of said battery sensed by said battery voltage sensor and said estimated voltage value, and sensing tentative abnormality of said output side voltage sensor based on an absolute value of a difference between a voltage value on the output side of said converter sensed by said output side voltage sensor and a voltage instruct value to said converter.

12. The abnormality monitoring apparatus according to claim 11, wherein
said electronic control unit further executes
a process of sensing that said battery voltage sensor is tentatively abnormal if the absolute value of the difference between the voltage value of said battery sensed by said battery voltage sensor and said estimated voltage value is at least a predetermined threshold value, and
a process of sensing that said output side voltage sensor is tentatively abnormal if the absolute value of the difference between the voltage value on the output side of said converter sensed by said output side voltage sensor and the voltage instruct value to said converter is at least a predetermined threshold value.

13. The abnormality monitoring apparatus according to claim 11, wherein
said electronic control unit further executes
a process of sensing that said battery voltage sensor is tentatively abnormal if a time, during which the absolute value of the difference between the voltage value of said battery sensed by said battery voltage sensor and said estimated voltage value is at least the predetermined threshold value, is at least a predetermined time, and a process of sensing that said output side voltage sensor is tentatively abnormal if a time, during which the absolute value of the difference between the voltage value on the output side of said converter sensed by said output side voltage sensor and the voltage instruct value to said converter is at least a predetermined threshold value, is at least a predetermined time.

14. The abnormality monitoring apparatus according to claim 11, wherein
said electronic control unit further executes
a process of specifying, if tentative abnormality of said sensors is not sensed while said converter is performing the voltage boosting operation or the stepping-down operation and when said converter is performing neither the voltage boosting operation nor the voltage stepping-down operation, an abnormal sensor out of said sensors based on an absolute value of a difference between the voltage value of said battery sensed by said battery voltage sensor and the voltage value on an output side of said converter sensed by said output side voltage sensor, and on a tolerance of each sensor.

15. The abnormality monitoring apparatus according to claim 14, wherein
said electronic control unit further executes
a process of specifying that said battery voltage sensor is the abnormal sensor, if the absolute value of the difference between the voltage value of said battery sensed by said battery voltage sensor and the voltage value on the output side of said converter sensed by said output side voltage sensor is at least a predetermined threshold value and the voltage value sensed by said battery voltage sensor is outside a tolerance range of said battery voltage sensor.

16. The abnormality monitoring apparatus according to claim 14, wherein
said electronic control unit further executes a process of specifying that said output side voltage sensor is the abnormal sensor, if the absolute value of the difference between the voltage value of said battery sensed by said battery voltage sensor and the voltage value on the output side of said converter sensed by said output side voltage sensor is at least a predetermined threshold value and the voltage value on the output side of said converter sensed by said output side voltage sensor is outside a tolerance range of said output side voltage sensor.

17. The abnormality monitoring apparatus according to claim 14, wherein
said electronic control unit further executes,
if: the absolute value of the difference between the voltage value of said battery sensed by said battery voltage sensor and the voltage value on the output side of said converter sensed by said output side voltage sensor is at least a predetermined threshold value; the voltage value sensed by said battery voltage sensor is not outside a tolerance range of said battery voltage sensor; and the voltage value on the output side of said converter sensed by said output side voltage sensor is not outside a tolerance range of said output side voltage sensor, a process of controlling said converter so that said converter starts the voltage boosting operation or the voltage stepping-down operation, and if tentative abnormality of said battery voltage sensor is sensed, specifying that said battery voltage sensor is abnormal.

18. The abnormality monitoring apparatus according to claim 14, wherein
said electronic control unit further executes,
if: the absolute value of the difference between the voltage value of said battery sensed by said battery voltage sensor and the voltage value on the output side of said converter sensed by said output side voltage sensor is at least a predetermined threshold value; the voltage value sensed by said battery voltage sensor is not outside a tolerance range of said battery voltage sensor; and the voltage value on the output side of said converter sensed by said output side voltage sensor is not outside a tolerance range of said output side voltage sensor, a process of controlling said converter so that said converter starts the voltage boosting operation or the voltage stepping-down operation, and if tentative abnormality of said battery voltage sensor is not sensed by said electronic control unit, specifying that said output side voltage sensor is abnormal.

19. The abnormality monitoring apparatus according to claim 11, wherein
said electronic control unit further executes
a process of specifying that said battery voltage sensor is abnormal if: tentative abnormality of said sensors is sensed while said converter is performing the voltage boosting operation or the voltage stepping-down operation; the voltage boosting operation or the voltage stepping-down operation by said converter is stopped; and an absolute value of a difference between the voltage value of said battery sensed by said battery voltage sensor and the voltage value on the output side of said converter sensed by said output side voltage sensor is at least a predetermined threshold value.

20. The abnormality monitoring apparatus according to claim 11, wherein
said electronic control unit further executes
a process of specifying that said battery voltage sensor and said output side voltage sensor are not tentatively abnormal, if: tentative abnormality of said sensors is sensed while said converter is performing the voltage boosting operation or the voltage stepping-down operation; the voltage boosting operation or the voltage stepping-down operation by said converter is stopped; and an absolute value of a difference between the voltage value of said battery sensed by said battery voltage sensor and the voltage value on the output side of said converter sensed by said output side voltage sensor is not at least a predetermined threshold value.

21. An abnormality monitoring method for a load driving circuit including: a converter performing at least one of a voltage boosting operation and a voltage stepping-down operation; a battery connected to an input side of said converter; a battery voltage sensor sensing a voltage value of said battery; and an output side voltage sensor sensing a voltage value on an output side of said converter, said load driving circuit supplying electric power from said converter to a load, said method comprising:
a battery voltage estimation calculating step of calculating an estimated voltage value of said battery;
a step of sensing tentative abnormality of said battery voltage sensor based on an absolute value of a difference between a voltage value of said battery sensed by said battery voltage sensor and said estimated voltage value when said converter is performing the voltage boosting operation or the voltage stepping-down operation; and
a step of sensing tentative abnormality of said output side voltage sensor based on an absolute value of a difference between a voltage value on the output side of said converter sensed by said output side voltage sensor and a voltage instruct value to said converter when said converter is performing the voltage boosting operation or the voltage stepping-down operation.

22. The abnormality monitoring method according to claim 21 further comprising:
a step of sensing that said battery voltage sensor is tentatively abnormal if the absolute value of the difference between the voltage value of said battery sensed by said battery voltage sensor and said estimated voltage value is at least a predetermined threshold value; and
a step of sensing that said output side voltage sensor is tentatively abnormal if the absolute value of the difference between the voltage value on the output side of said converter sensed by said output side voltage sensor and the voltage instruct value to said converter is at least a predetermined threshold value.

23. The abnormality monitoring method according to claim 21, further comprising:
a step of sensing that said battery voltage sensor is tentatively abnormal if a time, during which the absolute value of the difference between the voltage value of said battery sensed by said battery voltage sensor and said estimated voltage value is at least the predetermined threshold value, is at least a predetermined time; and
a step of sensing that said output side voltage sensor is tentatively abnormal if a time, during which the absolute value of the difference between the voltage value on the output side of said converter sensed by said output side voltage sensor and the voltage instruct value to said converter is at least a predetermined threshold value, is at least a predetermined time.

24. The abnormality monitoring method according to claim 21, further comprising:
a step of specifying, if tentative abnormality of said sensors is not sensed while said converter is performing the voltage boosting operation or the stepping-down operation and when said converter is performing neither the voltage boosting operation nor the voltage stepping-down operation, an abnormal sensor out of said sensors based on an absolute value of a difference between the voltage value of said battery sensed by said battery voltage sensor and the voltage value on an output side of said converter sensed by said output side voltage sensor, and on a tolerance of each sensor.

25. The abnormality monitoring method according to claim 24, further comprising
a step of specifying that said battery voltage sensor is the abnormal sensor, if the absolute value of the difference between the voltage value of said battery sensed by said battery voltage sensor and the voltage value on the output side of said converter sensed by said output side voltage sensor is at least a predetermined threshold value and the voltage value sensed by said battery voltage sensor is outside a tolerance range of said battery voltage sensor.

26. The abnormality monitoring method according to claim 24, further comprising
a step of specifying that said output side voltage sensor is the abnormal sensor, if the absolute value of the difference between the voltage value of said battery sensed by said battery voltage sensor and the voltage value on the output side of said converter sensed by said output side voltage sensor is at least a predetermined threshold value and the voltage value on the output side of said converter sensed by said output side voltage sensor is outside a tolerance range of said output side voltage sensor.

27. The abnormality monitoring method according to claim 24, further comprising,
if: the absolute value of the difference between the voltage value of said battery sensed by said battery voltage sensor and the voltage value on the output side of said converter sensed by said output side voltage sensor is at least a predetermined threshold value; the voltage value sensed by said battery voltage sensor is not outside a tolerance range of said battery voltage sensor; and the voltage value on the output side of said converter sensed by said output side voltage sensor is not outside a tolerance range of said output side voltage sensor, a step of controlling said converter so that said converter starts the voltage boosting operation or the voltage stepping-down operation, and if tentative abnormality of said battery voltage sensor is sensed, specifying that said battery voltage sensor is abnormal.

28. The abnormality monitoring method according to claim 24, further comprising
if: the absolute value of the difference between the voltage value of said battery sensed by said battery voltage sensor and the voltage value on the output side of said converter sensed by said output side voltage sensor is at least a predetermined threshold value; the voltage value sensed by said battery voltage sensor is not outside a tolerance range of said battery voltage sensor; and the voltage value on the output side of said converter sensed by said output side voltage sensor is not outside a tolerance range of said output side voltage sensor, a step of controlling said converter so that said converter starts the voltage boosting operation or the voltage stepping-down operation, and if tentative abnormality of said battery voltage sensor is not sensed, specifying that said output side voltage sensor is abnormal.

29. The abnormality monitoring method according to claim 21, further comprising
a step of specifying that said battery voltage sensor is abnormal if: tentative abnormality of said sensors is sensed while said converter is performing the voltage boosting operation or the voltage stepping-down operation; the voltage boosting operation or the voltage stepping-down operation by said converter is stopped; and an absolute value of a difference between the voltage value of said battery sensed by said battery voltage sensor and the voltage value on the output side of said converter sensed by said output side voltage sensor is at least a predetermined threshold value.

30. The abnormality monitoring method according to claim 21, further comprising
a step of specifying that said battery voltage sensor and said output side voltage sensor are not tentatively abnormal, if: tentative abnormality of said sensors is sensed while said converter is performing the voltage boosting operation or the voltage stepping-down operation; the voltage boosting operation or the voltage stepping-down operation by said converter is stopped; and an absolute value of a difference between the voltage value of said battery sensed by said battery voltage sensor and the voltage value on the output side of said converter sensed by said output side voltage sensor is not at least a predetermined threshold value.

* * * * *